Patented Oct. 11, 1932

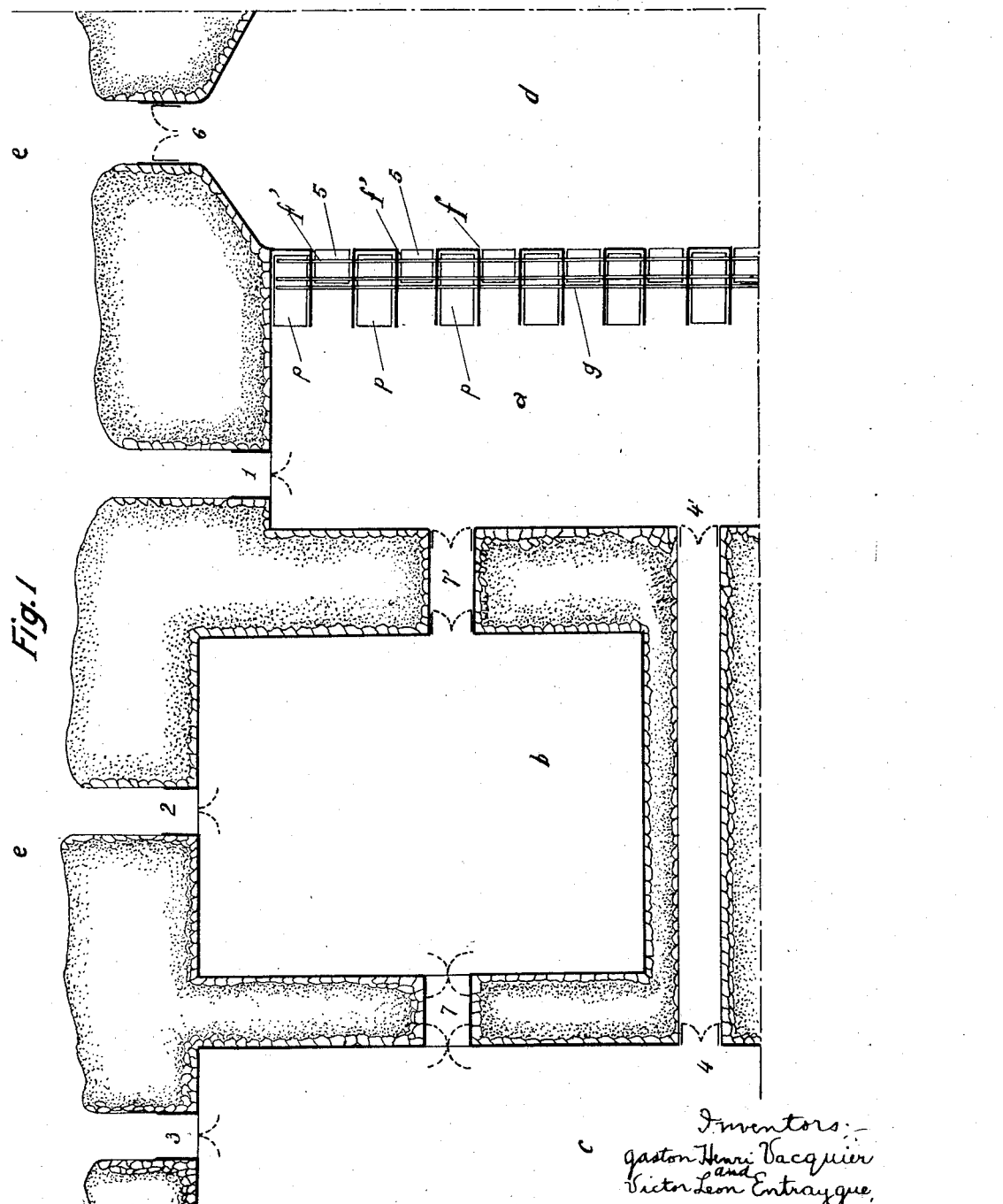

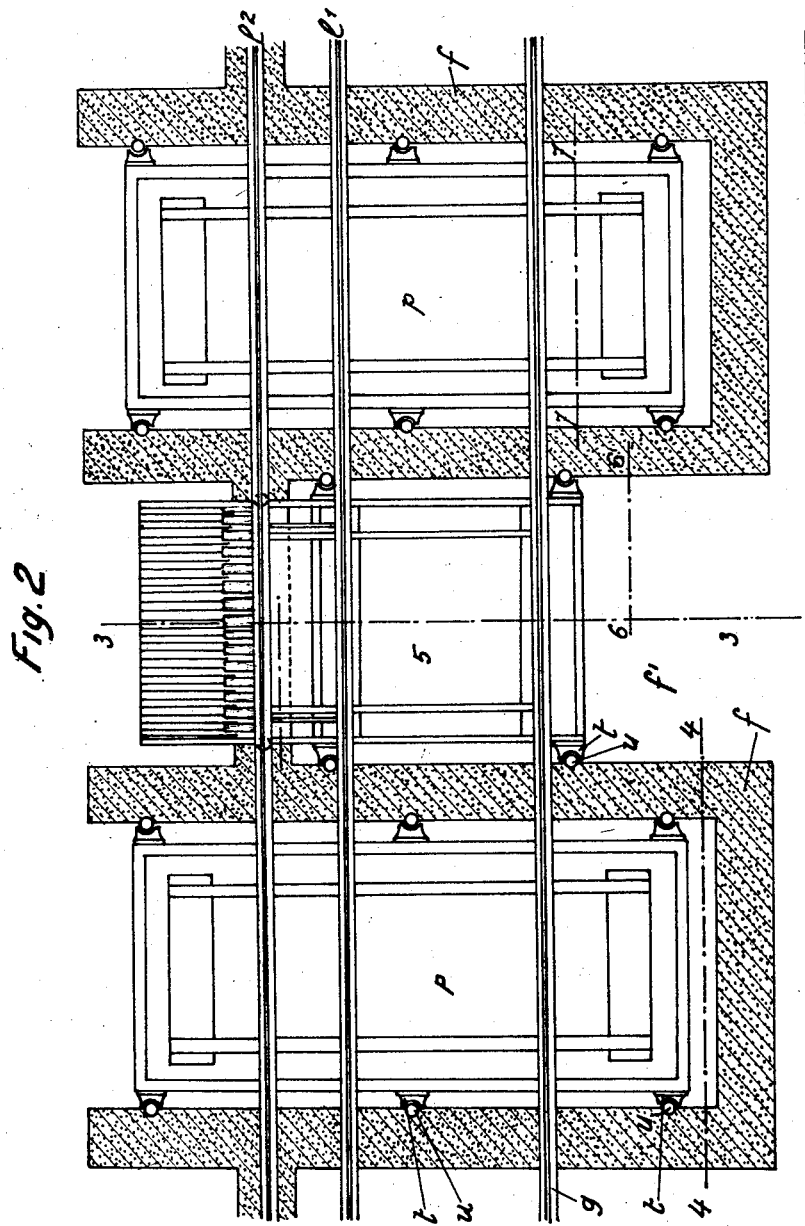

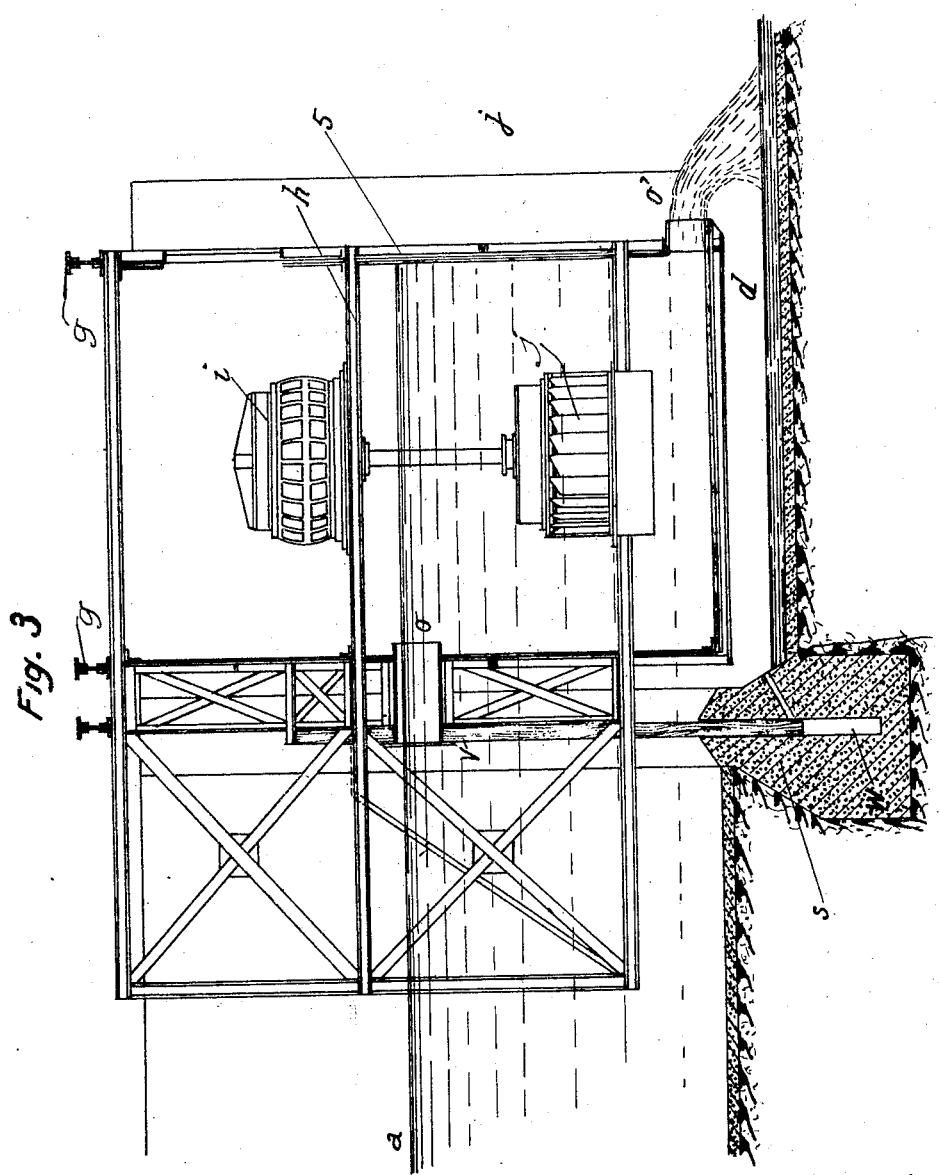

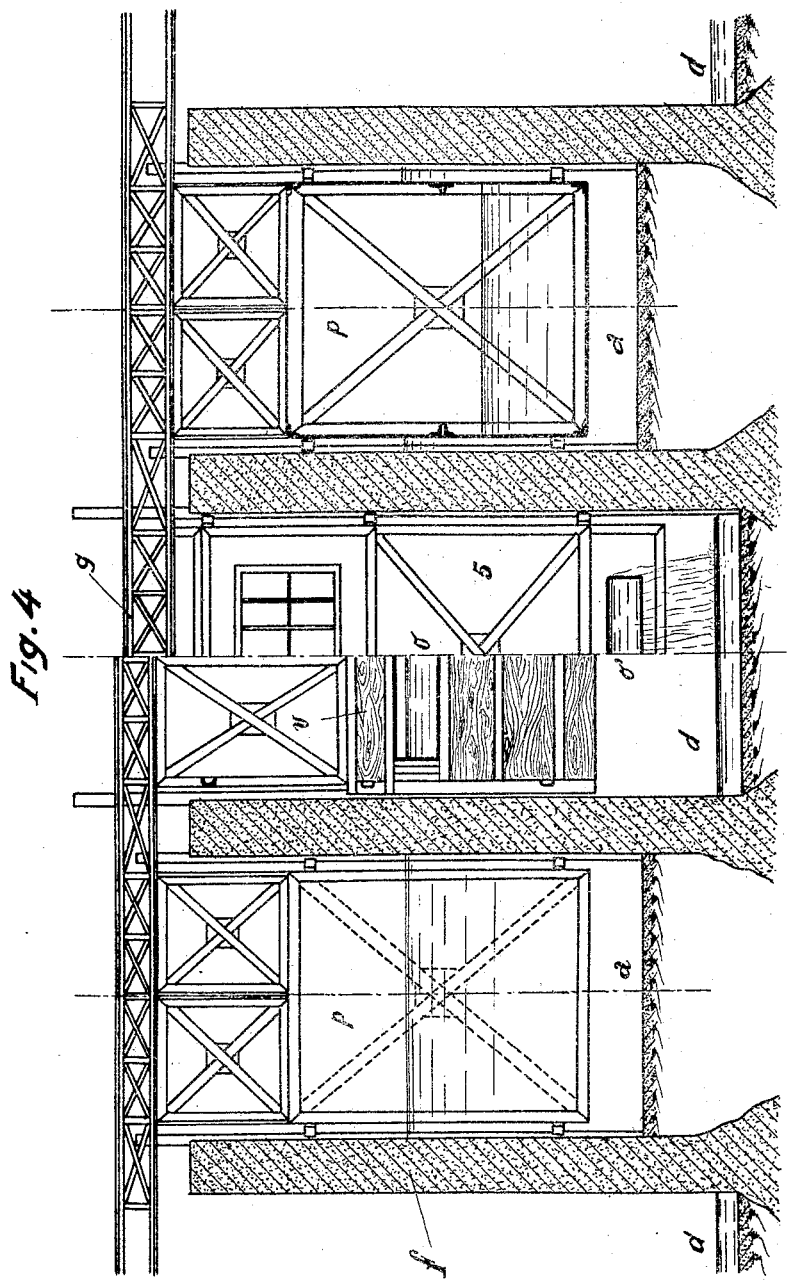

1,882,532

UNITED STATES PATENT OFFICE

GASTON HENRI VACQUIER, OF ARMENTIERES, AND VICTOR LEON ENTRAYGUE, OF MALO-LES-BAINS, FRANCE

HYDROELECTRIC PLANT

Application filed January 25, 1929, Serial No. 335,026, and in France February 4, 1928.

The present invention is relative to the utilization of the force produced by the sea in its ebb and flow movements by means of a hydroelectric plant. The chief characteristic of our plant consists in a regulating arrangement giving a constant fall of water in spite of the variations in level due to the tides and in spite of the periods of slack water.

According to our invention, said regulating arrangement consists in a slidable gate which is moved automatically by the variation in the level of water in the basins.

The required fall of water is obtained by means of a dam separating the useful waters from the waters which have been used.

Fig. 1 is a general plan view of the plant;

Fig. 2 shows in plan view on a larger scale a turbine carrying caisson and two floats or pontoons associated in the dam;

Fig. 3 is a section taken along the line 3—3 of Fig. 2;

Fig. 4 is a section taken along successive lines 4—4, 5—5, 6—6 and 7—7 of Fig. 2.

The plant is composed of:

A high level basin $a$ communicating with the sea through a sluice 1; two reserve basins $b$ and $c$ in communication with the sea through sluices 2 and 3; these two last mentioned basins communicate between each other and with $a$ through sluices 7 and 7' and 4 and 4'; a low level basin $d$ receives the so-called used waters after their passage through the turbines $j$ supported by the caissons 5. Basin $d$ communicates with the sea $e$ through sluices 6.

The plant operates in the following manner (Fig. 1); at high tide, the sluices 1, 2 and 3 are opened, $a$ $b$ and $c$ are at high tide level, the sluices 6, 4 and 4', 7 and 7' are closed.

At the end of the slack water at high tide, 1, 2 and 3 are closed. Then, use is made of the water contained in basin $a$ which passes through turbines $j$ to flow into low level basin $d$. When the level of $a$ has sunk, so that the caisson will be close to the bottom, sluice 7' is opened so as to allow the waters contained in $b$ to pass into $a$. The level of $a$ rises again as well as the caisson, then sinks until the waters of $b$ are exhausted. Sluices 4 and 4' are then opened so as to allow the waters contained in $c$ to be used.

During this cycle of operation as soon as the level of the sea has sunk below the minimum level of $d$, sluice 6 is opened for liberating the used waters and returning them to the open sea. Said sluice 6 remains open up to the moment when the tide attains the minimum lever of $d$.

Sluices 1, 2 and 3 which are opened as soon as the level of the sea has attained the level of the basins $a$ $b$ and $c$. At that moment, the turbines utilize directly the sea water and this until the end of high tide slack water. From then on, the cycle of operations is repeated permitting the utilization of the turbines without discontinuity.

As the continuity of operation is obtained through basins the constancy of the flow and consequently the constancy of the speed of revolution of the turbine is obtained by means of gate $v$ rigidly connected with the turbine-carrying caisson 5, and whose vertical movement is guided by the floating of the floats or pontoons $p$ (Figs. 2, 3 and 4.) The passage connecting basin $a$ to basin $d$ comprises a sill $s$ provided with a groove $w$ in which said gate is adapted to slide vertically so that said gate may always form a partition between basin $a$ and basin $d$. The conduit $o$ fitted to gate $v$ is so adjusted as to allow the rate of flow which is necessary and sufficient for producing the power of the alternator $i$ coupled with the turbine.

The floats $p$, carried by the water of basin $a$, support, by means of longitudinal girders $g$, the turbine-carrying caissons 5 which are suspended above basin $d$. The variations of level in basin $a$ are automatically imparted to gate $v$, and the amount of water admitted into the water chamber of the turbine is constant.

Any translational motion of the whole system is prevented by the vertical guides $u$ and the slides $t$.

The operation of the sluices in the various basins, such as described, allows of having between the levels at $a$ and $d$ a height which is always greater than the height of fall between $o$ and $o'$. The type of turbines which is employed is the one which is used in connection with falls of small height.

The present plant can be operated even with tides of low amplitude, say from 5 or 6 meters.

What we claim is:

1. A tidal power plant, comprising in combination, a high level basin, a low level basin, a passage between said two basins, a sill in said passage provided with a vertical groove, a gate adapted to slide vertically in said groove and provided with an aperture, a vertically slidable caisson mounted in the low level basin and rigidly connected to said gate, a conduit connecting said aperture in said gate to the inside of said caisson whereby water is allowed to flow from the high level basin into said caisson, a spout on said caisson for allowing water to flow therefrom into said low level basin, a turbine mounted in said caisson, and two floats located in the high level basin on either side of said caisson respectively and adapted to support said caisson.

2. A tidal power plant, comprising in combination, a high level basin, a low level basin, a passage between said two basins, a sill in said passage provided with a vertical groove, a gate adapted to slide vertically in said groove and provided with an aperture, a vertically slidable caisson mounted in the low level basin and rigidly connected to said gate, a conduit connecting said aperture in said gate to the inside of said caisson whereby water is allowed to flow from the high level basin into said caisson, a spout on said caisson for allowing water to flow therefrom into said low level basin, a turbine mounted in said caisson, two floats located in the high level basin on either side of said caisson respectively, and a plurality of horizontal girders rigidly secured to the upper part of said floats and to the upper part of said caisson, whereby said caisson is supported by said floats.

3. A tidal power plant, comprising in combination, a high level basin, a low level basin, a passage between said two basins, a sill in said passage provided with a vertical groove, a gate adapted to slide vertically in said groove and provided with an aperture, a vertically slidable caisson mounted in the low level basin and rigidly connected to said gate, a conduit connecting said aperture in said gate to the inside of said caisson whereby water is allowed to flow from the high level basin into said caisson, a spout on said caisson for allowing water to flow therefrom into said low level basin, a turbine disposed in the lower part of said caisson so as to work in a drowned position, an electric generator mounted in said caisson directly above said turbine, a common shaft for said turbine and said generator, two floats located in the high level basin on either side of said caisson respectively, and a plurality of horizontal girders rigidly secured to the upper part of said floats and to the upper part of said caisson, whereby said caisson is supported by said floats.

In testimony whereof we have signed this specification.

GASTON HENRI VACQUIER.
VICTOR LEON ENTRAYGUE.